(12) United States Patent
Wang et al.

(10) Patent No.: US 9,658,387 B2
(45) Date of Patent: May 23, 2017

(54) DOUBLE-SCREEN DISPLAY DEVICE AND DOUBLE-SCREEN DISPLAYING METHOD

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Huan Wang, Beijing (CN); Wugen Xin, Beijing (CN)

(73) Assignees: BOE TECHNOLOGY GROUP CO., LTD. (CN); HEFEI BOE OPTOELECTRONICS TECHNOLOGY CO., LTD. (CN)

( * ) Notice: Subject to any disclaimer, the term of this patent is extended or adjusted under 35 U.S.C. 154(b) by 213 days.

(21) Appl. No.: 14/389,575

(22) PCT Filed: Mar. 11, 2014

(86) PCT No.: PCT/CN2014/073219
§ 371 (c)(1),
(2) Date: Sep. 30, 2014

(87) PCT Pub. No.: WO2015/035757
PCT Pub. Date: Mar. 19, 2015

(65) Prior Publication Data
US 2016/0259119 A1 Sep. 8, 2016

(30) Foreign Application Priority Data
Sep. 13, 2013 (CN) .......................... 2013 1 0422194

(51) Int. Cl.
*G02B 27/26* (2006.01)
*F21V 8/00* (2006.01)
(Continued)

(52) U.S. Cl.
CPC ......... *G02B 6/0078* (2013.01); *G02B 6/0023* (2013.01); *G02B 27/126* (2013.01);
(Continued)

(58) Field of Classification Search
CPC ......................... G02B 27/126; G02F 1/13362
(Continued)

(56) References Cited

U.S. PATENT DOCUMENTS 7,511,773 B2 * 3/2009 Wu ...................... G02B 27/285
349/5
7,542,206 B2 * 6/2009 Schuck ................ G02B 6/0096
353/20
(Continued)

FOREIGN PATENT DOCUMENTS

CN         1880978         12/2006
CN       101097296          1/2008
(Continued)

OTHER PUBLICATIONS

First Office Action issued in corresponding Chinese Application No. 201310422194X dated Jun. 3, 2015.
(Continued)

*Primary Examiner* — Karabi Guharay
(74) *Attorney, Agent, or Firm* — Brooks Kushman P.C.

(57) ABSTRACT

The present disclosure relates to the field of display technology, and more particularly to a double-screen display device. The device includes: a first display panel and a second display panel; a light source; a polarization beam splitter configured to divide light emitted from the light source into P light and S light, and cause one of the P light and the S light to be incident on a first optical module and the other one to be incident on a second optical module; the first optical module configured to transmit received light to
(Continued)

the first display panel; the second optical module configured to transmit received light to the second display panel.

18 Claims, 3 Drawing Sheets

(51) Int. Cl.
G02F 1/1333 (2006.01)
G02F 1/1335 (2006.01)
G02B 27/12 (2006.01)

(52) U.S. Cl.
CPC ...... *G02F 1/13336* (2013.01); *G02F 1/13362* (2013.01); *G02F 2202/28* (2013.01)

(58) Field of Classification Search
USPC .......................................................... 362/19
See application file for complete search history.

(56) References Cited

U.S. PATENT DOCUMENTS

| | | | | |
|---|---|---|---|---|
| 2002/0191297 A1* | 12/2002 | Gleckman | .......... | G02B 27/0172 359/629 |
| 2009/0059173 A1 | 3/2009 | Azor et al. | | |
| 2013/0100527 A1* | 4/2013 | Chung | ..................... | G02B 5/30 359/449 |
| 2013/0162503 A1* | 6/2013 | Chen | ........................ | G09G 5/10 345/1.3 |

FOREIGN PATENT DOCUMENTS

| | | |
|---|---|---|
| CN | 201315139 | 9/2009 |
| CN | 103064239 | 4/2013 |
| CN | 103176527 | 6/2013 |
| CN | 103376588 | 10/2013 |
| CN | 103424918 | 12/2013 |
| CN | 103472620 | 12/2013 |
| KR | 20120007101 | 1/2012 |

OTHER PUBLICATIONS

International Search Report and Written Opinion issued in corresponding International Application No. PCT/CN2014/073219 dated May 26, 2014.

* cited by examiner

DOUBLE-SCREEN DISPLAY DEVICE AND DOUBLE-SCREEN DISPLAYING METHOD

CROSS-REFERENCE TO RELATED APPLICATION

This application is the U.S. national phase of PCT Application No. PCT/CN2014/073219 filed on Mar. 11, 2014, which claims priority to Chinese Patent Application No, 201310422194.X filed on Sep. 13, 2013, the disclosures of which are incorporated in their entirety by reference herein.

TECHNICAL FIELD

The present disclosure relates to the field of display technology, and more particularly to a double-screen display device and a double-screen displaying method.

BACKGROUND

With development of displays, users put forward higher requirements for display effects of the displays. Except for using a single screen to display, a display may use double screens to display. A double-screen display has two display screens which may display different contents, respectively. The double-screen display may be applied in many areas, for example, it may facilitate checking data during data processing, or it may achieve a purpose of entertainment while working.

An existing double-screen display usually includes a host computer equipped with two separate displays. However, the two separate displays result in disadvantages of high cost, occupying a large space, and large power consumption, etc.

SUMMARY

One technical problem to be solved by the present disclosure is how to provide a double-screen display device so as to overcome the disadvantages of high cost, occupying a large space, large power consumption, etc., caused by using two separate displays in one double-screen display device in the prior art.

In order to solve the above technical solution, the present disclosure provides a double-screen display device including:

a first display panel and a second display panel;

a light source;

a polarization beam splitter configured to divide light emitted from the light source into P light and S light, and cause one of the P light and the S light to be incident on a first optical module and the other one to be incident on a second optical module;

the first optical module configured to transmit received light to the first display panel; the second optical module configured to transmit received light to the second display panel.

Optionally, the light emitted from the light source is directly incident on the polarization beam splitter.

Optionally, each of the first display panel and the second display panel has an upper polarizer and a lower polarizer disposed thereon;

a transmission axis direction of the lower polarizer of the first display panel is identical to a polarization direction of a long axis of linearly polarized light emitted from the first optical module;

a transmission axis direction of the lower polarizer of the second display panel is identical to a polarization direction of a long axis of linearly polarized light emitted from the second optical module.

Optionally, the first display panel and the second display panel are jointed in a vertical direction or in a horizontal direction.

Optionally, the first optical module and/or the second optical module include a light guide plate.

Optionally, the display device further includes a backplane; the light source is fixed on the backplane.

Optionally, the light source is fixed on the backplane through thermal conductive adhesive.

Optionally, the light source is an LED lamp.

Optionally, the polarization beam splitter includes a triangular prim, a polarization beam splitting film layer disposed on one side of the triangular prim, and a reflective film layer disposed on another side of the triangular prim.

Optionally, the reflective film is a gold-plated reflective film layer, a silver-plated reflective film layer, an aluminum-plated reflective film layer, or other reflective film layers which effectively reflect visible light.

Optionally, the triangular prim is an isosceles triangular prism.

Optionally, the triangular prism is an equilateral triangle prism.

According to another aspect of the present disclosure, a double-screen displaying method is provided and includes:

emitting, by a light source light, to a polarization beam splitter;

dividing, by the polarization beam splitter, the light emitted from the light source into P light and S light, and causing one of the P light and the S light to be incident on a first optical module and the other one to be incident on a second optical module;

transmitting, by the first optical module, received light to a first display panel; and transmitting, by the second optical module, received light to a second display panel.

The present disclosure provides a double-screen display device and a double-screen displaying method, which may realize displaying of different images on double screens in a single display device, and this may effectively reduce production cost, reduce occupied space, and achieve energy saving and environmental protection by the greatest extent.

where, 1: first display panel; 11: first lower polarizer; 12: first liquid crystal layer; 13: first upper polarizer; 2: second display panel; 21: second lower polarizer; 22: second liquid crystal layer; 23: second upper polarizer; 3: front frame; 4: light source; 5: polarization beam splitter; 51: prism; 52: fixing mechanism; 53: double-sided adhesive; 511: polarization beam splitting film; 512: reflective film layer; 6: first optical module; 7: second optical module; 8: fixing elements; 9: backplane; A: first image; B: second image; O: light.

DETAILED DESCRIPTION

Implementations of the present disclosure will be described in detail with reference to embodiments and drawings. The following embodiments are merely used to illustrate the present disclosure, but not used to limit the scope of the present disclosure.

Figure 1:
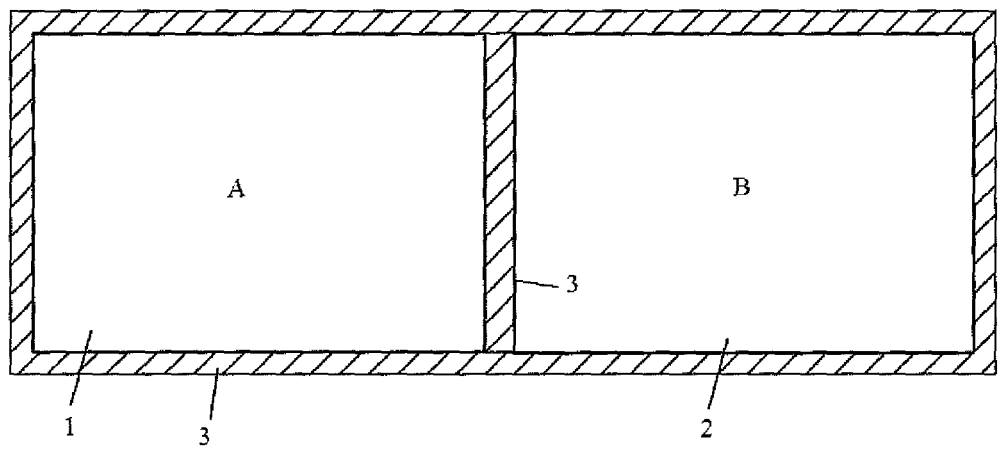
FIG. 1 is a schematic plan diagram showing a double-screen display device according to one embodiment of the present disclosure.
Figure 2:
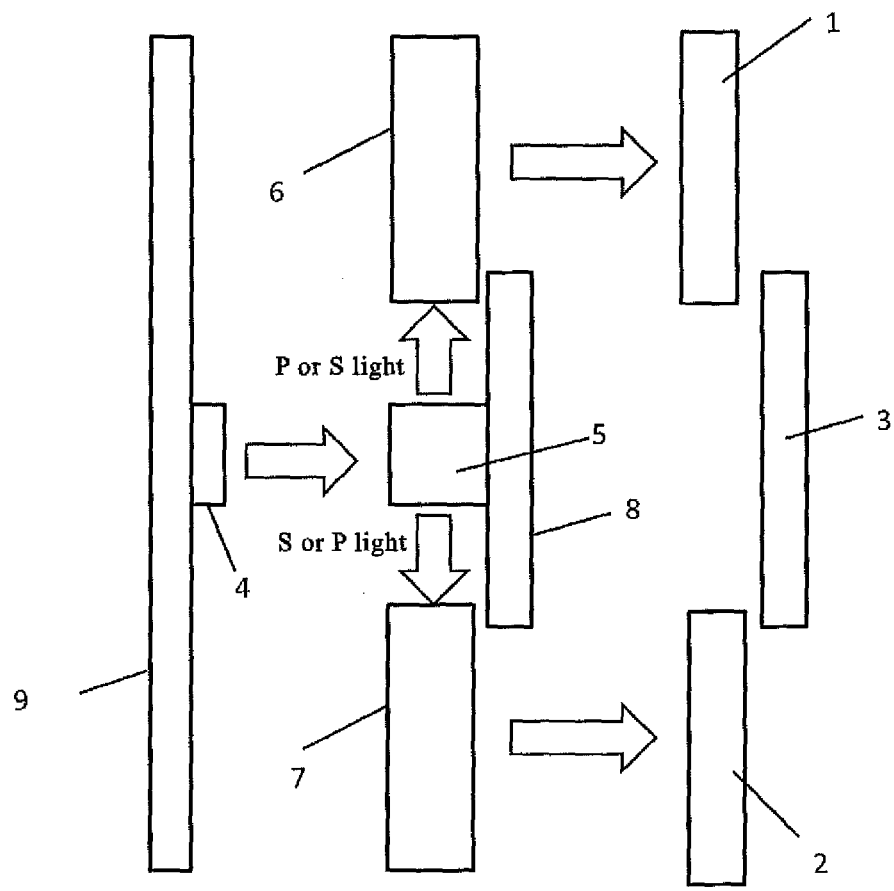
FIG. 2 is a side view showing a structure of the double-screen display device according to one embodiment of the present disclosure.

As shown in FIG. 1 and FIG. 2, one embodiment of the present disclosure provides a double-screen display device which includes a first display panel 1 and a second display panel 2;

a light source 4, light emitted from the light source 4 directly entering a polarization beam splitter 5;

the polarization beam splitter 5 configured to divide the light emitted from the light source 4 into P light and S light, and cause one of the P light and the S light to be coupled to a first optical module 6 and the other one to be coupled to a second optical module 7;

the first optical module 6 configured to uniformly transmit received light to a first display panel 1; the second optical module 7 configured to uniformly transmit received light to a second display panel 2. By loading different signals to the first display panel 1 and the second display panel 2, the first display panel 1 and the second display panel 2 may display different images.

The first optical module and/or the second optical module may include a light guide plate configured to uniformize the light divided from the polarization beam splitter 5 so as to achieve a better display effect.

Specifically, the first display panel 1 and the second display panel 2 of this embodiment are display panels which do not include backlights. The first display panel 1 and the second display panel 2 may be jointed in a horizontal direction to form a double-screen display, and also may be jointed in a vertical direction to form a double-screen display. Light exit directions of the polarization beam splitter 5 may also be adjusted through adjusting an angle or a position of the polarization beam splitter 5, so as to cause the emitted light to enter the display panels.

The first display panel 1 and the second display panel 2 display a first image A and a second image B, respectively. The whole device is fixed through a front frame 3 and fixing elements (not shown).

Figure 3:
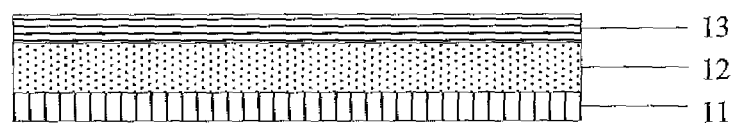
FIG. 3 is a schematic diagram showing a structure of a first display panel of the double-screen display device according to one embodiment of the present disclosure.

Referring to FIG. 3, the first display panel 1 includes a first liquid crystal layer 12. A first upper polarizer 13 and a first lower polarizer 11 are disposed on the first display panel 1. A transmission axis direction of the first lower polarizer 11 on the first display panel 1 is configured to be identical to a polarization direction of a long axis of linearly polarized light emitted from the first optical module 6.

Figure 4:
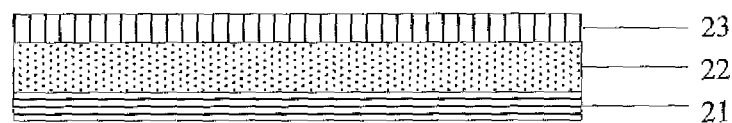
FIG. 4 is a schematic diagram showing a structure of a second display panel of the double-screen display device according to one embodiment of the present disclosure.

Referring to FIG. 4, the second display panel 2 includes a second liquid crystal layer 22. A second upper polarizer 23 and a second lower polarizer 21 are disposed on the second display panel 2. A transmission axis direction of the second lower polarizer 21 on the second display panel 2 is identical to a polarization direction of a long axis of linearly polarized light emitted from the second optical module 7.

Of course, in order to improve display effect, other optical film such as a prism film, a diffusion sheet, a reflection sheet, etc., may be added on a top or bottom of the display panel. FIG. 3 and FIG. 4 in the present disclosure merely schematically show general structures of display panels of the display device, and do not show specific structures of the panels.

The light source 4 may optionally include an LED lamp. Light O emitted from the LED lamp is natural light. The display device further includes a backplane 9. The light source 4 is fixed on the backplane 9 through, for example, thermal conductive adhesive.

Figure 5:
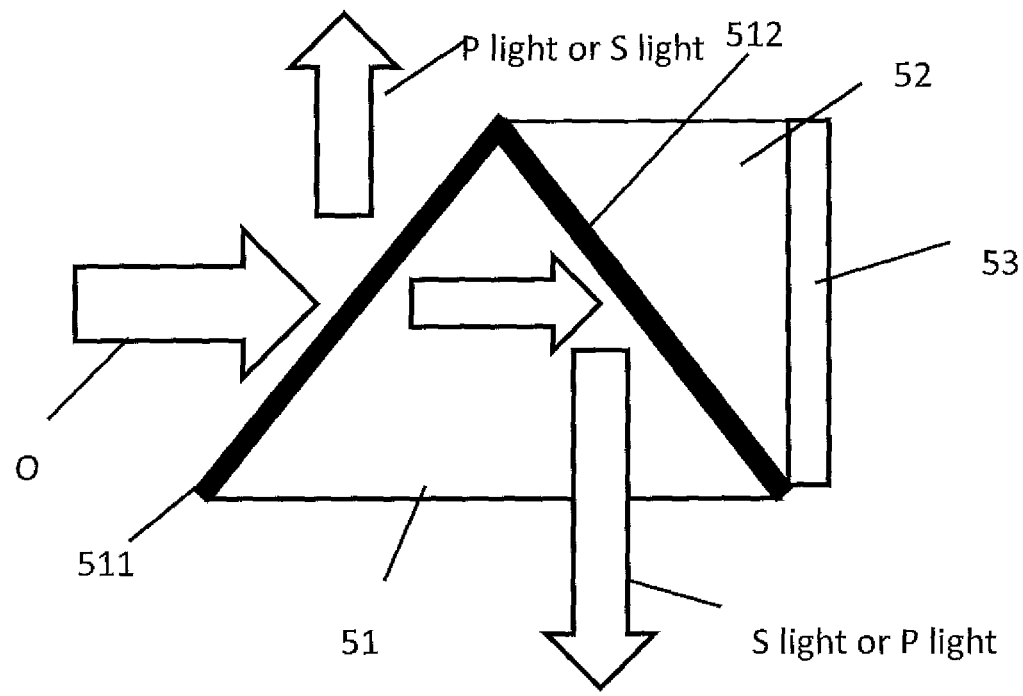
FIG. 5 is a schematic diagram showing a structure of a polarization beam splitter of the double-screen display device according to one embodiment of the present disclosure.

As shown in FIG. 5, the polarization beam splitter 5 includes a prism 51. The prism 51 is a triangular prim. A polarization beam splitting film 511 is disposed on one side of the triangular prim; and a reflective film layer 512 is disposed on another side of the triangular prim. The triangular prim is optionally an isosceles triangular prism. The isosceles triangular prism is optionally an equilateral triangle prism.

The polarization beam splitting film 511 may perform an effective polarization beam splitting effect on visible light. In this embodiment, the polarization beam splitting film 511 reflects one of the P light and the S light, and allows the other light to transmit therethrough. The transmitted light is incident on the reflective film layer 512 on another side of the triangular prism, and then is reflected to another direction.

The reflective film layer 512 may be, for example, a gold-plated reflective film layer, a silver-plated reflective film layer, an aluminum-plated reflective film layer, or other reflective film layers which can effectively reflect visible light.

The polarization beam splitter 5 further includes a fixing mechanism 52. The fixing mechanism 52 fixes the polarization beam splitter 5 through a double-sided adhesive 53 or other manners, so that the polarization beam splitter 5 may stably realize splitting effect.

Comparing with realizing double display in the prior art in which one display screen requires one corresponding light source, the two display panels of the double-screen display device of this embodiment require only one light source, and this may reduce power consumption by the greatest extent and realize energy saving and environmental protection.

A double-screen imaging principle of the double-screen display device according to one embodiment of the present disclosure will be described in details hereinafter.

Figure 6A:
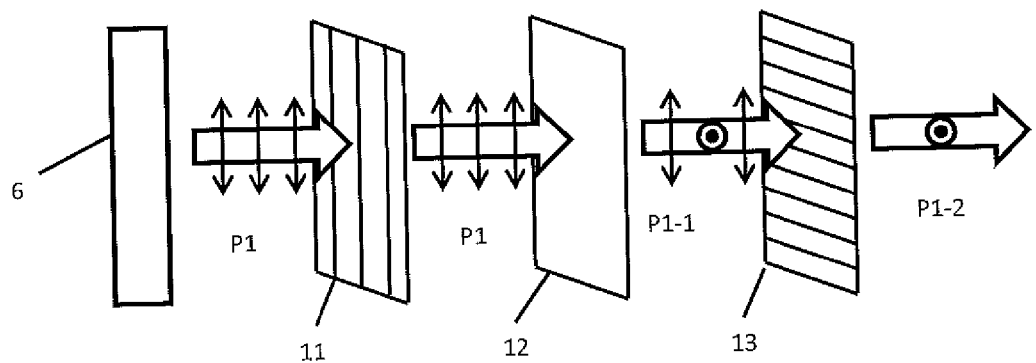
FIG. 6A and FIG. 6B are schematic diagrams showing an imaging principle of the double-screen display device according to one embodiment of the present disclosure.

Referring to FIG. 6A, FIG. 6A shows an imaging principle of the first display panel 1.

For example, the polarization beam splitter 5 is configured to couple polarized light P1 to the first optical module 6; the first optical module 6 uniformly transmits the coupled polarized light P1 to the first display panel 1. Since the transmission axis direction of the first lower polarizer 11 matches with a direction of the coupled polarized light P1, thus, most of the polarized light P1 may completely pass through the first lower polarizer 11; after being adjusted by the first liquid crystal layer 12, the linearly polarized light Pi may be converted into elliptically or circularly polarized light P1-1. Then, the elliptically or circularly polarized light P1-1 pass through the first upper polarizer 13 which has a direction perpendicular to the direction of the first lower polarizer 11, and only some light P1-2, which is identical to a direction of the first upper polarizer 13, may pass therethrough.

Figure 6B:
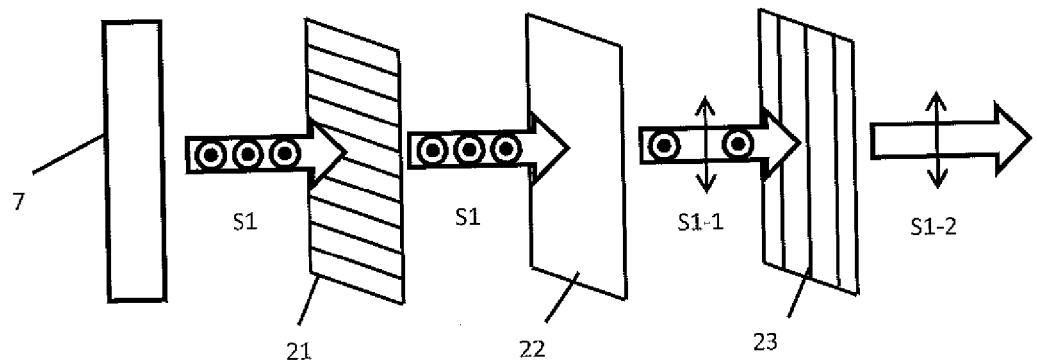

Referring to FIG. 6B, a principle shown in FIG. 6B is similar to that shown in FIG. 6A, and the difference lies in that a polarization direction of the second lower polarizer 21 and a polarization direction of the first lower polarizer 11 are perpendicular to each other, and a polarization direction of the second upper polarizer 23 and a polarization direction of the first upper polarizer 13 are perpendicular to each other. For example, the polarization beam splitter 5 is configured to transmit light Si to the second optical module 7; the second optical module 7 uniformly transmits the linearly polarized light S1 to the second display panel 2. Since the transmission axis direction of the second lower polarizer 21 matches with a direction of the linearly polarized light S1, thus, the linearly polarized light S1 may completely pass through the second lower polarizer 21; after being adjusted by the second liquid crystal layer 22, the linearly polarized light S1 may be converted into elliptically or circularly polarized light S1-1. Then, the elliptically or circularly polarized light S1-1 pass through the second upper polarizer 23 which has a direction perpendicular to the direction of the second lower polarizer 21, and only some light S1-2, which is identical to a direction of the second upper polarizer 23, may pass therethrough.

The present disclosure provides a double-screen display device, which may realize displaying of different images on double screens in a single display device, and this may effectively reduce production cost, reduce occupied space, and achieve energy saving and environmental protection by the greatest extent.

Those described above are only exemplary embodiments of the present disclosure. It should be noted, for those skilled in the art, some modifications and alterations may be made without departing from the technical principle of the present disclosure, and these should fall within the scope of the present disclosure.

What is claimed is:

1. A double-screen display device, comprising:
   a first display panel and a second display panel;
   a light source;
   a polarization beam splitter configured to divide light emitted from the light source into P light and S light, and cause one of the P light and the S light to be incident on a first optical module and the other one to be incident on a second optical module;
   the first optical module configured to transmit received light to the first display panel; the second optical module configured to transmit received light to the second display panel,
   wherein the light emitted from the light source is directly incident on the polarization beam splitter, and the polarization beam splitter comprises a triangular prism, a polarization beam splitting film layer for reflecting one of the P light and the S light and transmitting the other one of the P light and the S light disposed on one side of the triangular prism, and a reflective film layer for reflecting the transmitted other one of the P light and the S light disposed on another side of the triangular prism.

2. The double-screen display device according to claim 1, wherein each of the first display panel and the second display panel is provided with an upper polarizer and a lower polarizer;
   a transmission axis direction of the lower polarizer of the first display panel is identical to a polarization direction of a long axis of linearly polarized light emitted from the first optical module;
   a transmission axis direction of the lower polarizer of the second display panel is identical to a polarization direction of a long axis of linearly polarized light emitted from the second optical module.

3. The double-screen display device according to claim 2, wherein,
   the transmission axis direction of the lower polarizer of the first display panel is perpendicular to a transmission axis direction of the upper polarizer of the first display panel; and
   the transmission axis direction of the lower polarizer of the second display panel is perpendicular to a transmission axis direction of the upper polarizer of the second display panel.

4. The double-screen display device according to claim 1, wherein
   the first display panel and the second display panel are jointed in a vertical direction or in a horizontal direction.

5. The double-screen display device according to claim 1, wherein the first optical module and/or the second optical module comprises a light guide plate.

6. The double-screen display device according to claim 1, further comprising a backplane; the light source is fixed on the backplane.

7. The double-screen display device according to claim 6, wherein the light source is fixed on the backplane through thermal conductive adhesive.

8. The double-screen display device according to claim 1, wherein the light source is an LED lamp.

9. The double-screen display device according to claim 1, wherein the reflective film layer is a gold-plated reflective film layer, a silver-plated reflective film layer, an aluminum-plated reflective film layer, or other reflective film layers which effectively reflect visible light.

10. The double-screen display device according to claim 1, wherein the triangular prim is an isosceles triangular prism.

11. The double-screen display device according to claim 10, wherein the triangular prism is an equilateral triangle prism.

12. A double-screen displaying method, comprising:
    directly emitting, by a light source, light to a polarization beam splitter;
    dividing, by the polarization beam splitter, the light emitted from the light source into P light and S light, and causing one of the P light and the S light to be incident on a first optical module and the other one to be incident on a second optical module;
    transmitting, by the first optical module, received light to a first display panel; and
    transmitting, by the second optical module, received light to a second display panel,
    wherein the polarization beam splitter comprises a triangular prism, a polarization beam splitting film layer for reflecting one of the P light and the S light and transmitting the other one of the P light and the S light disposed on one side of the triangular prism, and a reflective film layer for reflecting the transmitted other one of the P light and the S light disposed on another side of the triangular prism.

13. The double-screen displaying method according to claim 12, wherein each of the first display panel and the second display panel is provided with an upper polarizer and a lower polarizer;

a transmission axis direction of the lower polarizer of the first display panel is identical to a polarization direction of a long axis of linearly polarized light emitted from the first optical module;

a transmission axis direction of the lower polarizer of the second display panel is identical to a polarization direction of a long axis of linearly polarized light emitted from the second optical module.

14. The double-screen displaying method according to claim 13, wherein the first display panel and the second display panel are jointed in a vertical direction or in a horizontal direction.

15. The double-screen displaying method according to claim 13, wherein the transmission axis direction of the lower polarizer of the first display panel is perpendicular to a transmission axis direction of the upper polarizer of the first display panel; and the transmission axis direction of the lower polarizer of the second display panel is perpendicular to a transmission axis direction of the upper polarizer of the second display panel.

16. The double-screen displaying method according to claim 12, wherein the first display panel and the second display panel are jointed in a vertical direction or in a horizontal direction.

17. The double-screen displaying method according to claim 12, wherein a display device further comprises a backplane; the light source is fixed on the backplane.

18. The double-screen displaying method according to claim 17, wherein the light source is fixed on the backplane through thermal conductive adhesive.

* * * * *

UNITED STATES PATENT AND TRADEMARK OFFICE
CERTIFICATE OF CORRECTION

PATENT NO. : 9,658,387 B2  
APPLICATION NO. : 14/389575  
DATED : May 23, 2017  
INVENTOR(S) : Huan Wang et al.

Page 1 of 1

It is certified that error appears in the above-identified patent and that said Letters Patent is hereby corrected as shown below:

In the Claims

Column 6, Line 38, Claim 10:
After "wherein the triangular"
Delete "prim" and
Insert -- prism --.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*